United States Patent [19]

Wang et al.

[11] Patent Number: 4,714,529
[45] Date of Patent: Dec. 22, 1987

[54] METHOD OF COATING METAL SURFACES IN OIL-BASED LUBRICANTS

[75] Inventors: Su-Chee S. Wang, Sterling Heights; Simon C. Tung, Rochester, both of Mich.

[73] Assignee: General Motors Corporation, Detroit, Mich.

[21] Appl. No.: 809,126

[22] Filed: Dec. 16, 1985

[51] Int. Cl.$^4$ ................ C25D 11/00; C25D 11/36
[52] U.S. Cl. ................ 204/56.1; 204/14.1; 204/58.5; 204/147
[58] Field of Search ............ 204/14.1, 56 R, 58.5, 204/147, 148, 196, 197

[56] References Cited

U.S. PATENT DOCUMENTS

| | | | |
|---|---|---|---|
| 870,937 | 11/1907 | Coslett | 204/56 R |
| 2,927,068 | 3/1960 | Marsh et al. | 204/147 |
| 3,262,867 | 7/1966 | Callahan | 204/56 R |
| 3,409,525 | 11/1968 | Taylor et al. | 204/147 |
| 3,479,260 | 11/1969 | Rauch et al. | 204/5 RR |
| 3,484,344 | 12/1969 | Spiller | 204/56 R |
| 4,522,892 | 6/1985 | Shindow et al. | 204/56 R |

OTHER PUBLICATIONS

Pitting and Deposits with an Organic Fluid by Electrolysis and by Fluid Flow, by T. R. Beck, D. W. Mahaffey, and J. H. Olsen, *J. Electrochem. Soc.*, Feb. 1972, pp. 155–160.

Effects of Additives on the Friction of Steel on Steel, by Fred G. Rounds *ASLE Transactions* 7, 11–23 (1964).

Some Factors Affecting the Decomposition of Three Commercial Zinc Organodithiophosphates, by Fred G. Rounds, *ASLE Transactions,* vol. 18, 2 pp. 79–89, 1973.

Additive Interactions and Their Effect on the Performance of a Zinc Dialkyl Dithiophosphate, by Fred Rounds, *ASLE Transactions,* vol. 21, 2, pp. 91–101, 1976.

General Motors Engineering Standards, GM 4277-M, Anti-Friction Finish-Phosphate Type, p. 43.101, Nov. 1979, Dec. 1984, pp. 43.201–43.203.

*Metals Handbook,* Nonmetallic Coating Processes, pp. 531–547.

"Electrophysical and Electrochemical Phenomena in Friction Cutting, and Lubrication", by S. N. Postnikov, pp. 93, 111–113, Dec. 1969.

*Primary Examiner*—T. Tung
*Attorney, Agent, or Firm*—R. W. Tung

[57] ABSTRACT

A method of using an electrochemical process in oil-based lubricants to form friction-reducing and wear-reducing iron phosphate films on metal surfaces. An electrolytic additive of dialkyl hydrogen phosphate is first added to the oil-based lubricant to improve its electrical conductance and to make it an ionic conductor. This method enables not only the formation of uniform iron phosphate films on metal surfaces but also the in-situ repair of such films after damage has occurred.

4 Claims, 4 Drawing Figures

METHOD OF COATING METAL SURFACES IN OIL-BASED LUBRICANTS

FIELD OF THE INVENTION

This invention generally relates to a method of using an electrochemical process in oil-based lubricants to form friction-reducing and wear-reducing iron phosphate films on metal surfaces and, more particularly, is concerned with a method of using an electrical potential in oil-based lubricants containing a dialkyl hydrogen phosphate additive to form iron phosphate films on metal surfaces to reduce friction and wear.

BACKGROUND OF THE INVENTION

In the automotive industry, engine friction and wear reduction by adding additives to an oil-based lubricant is one of the most appealing approaches for improving vehicle fuel economy. This is because the benefits potentially realizable can be readily applied to all vehicles at low cost. Additives have been added to oil-based lubricants to reduce friction and wear by creating chemical reactions between the additives and the metal surfaces. However, these chemical reactions are very slow and the reaction films thus formed are generally not uniform. It has also been proposed that metal surfaces may be coated with friction-reducing or wear-reducing films before they are assembled into a vehicle. However, it is extremely difficult to repair damaged friction-reducing or wear-reducing films after a vehicle has been assembled and operated.

The formation of friction-reducing and wear-reducing films on metal surfaces immersed in aqueous solutions or molten salts by an electrochemical technique has been performed by others. Great difficulties were encountered when the same electrochemical technique was used in a process to form friction-reducing and wear-reducing films on metal surfaces immersed in oil-based lubricants. Since oil-based lubricants have extremely high electrical resistance, electrical current cannot pass through the lubricants.

It is therefore an object of the present invention to provide a method of coating metal surfaces immersed in oil-based lubricants with a friction-reducing and wear-reducing film by an electrochemical process.

It is another object of the present invention to provide a method of coating metal surfaces immersed in oil-based lubricants with a friction-reducing and wear-reducing film electrochemically by adding an additive to the oil-based lubricant such that electrical current may pass between the two metal surfaces immersed in the oil-based lubricant.

It is a further object of the present invention to provide a method of coating metal surfaces immersed in oil-based lubricants with a friction-reducing and wear-reducing film electrochemically by adding a dialkyl hydrogen phosphate additive to the lubricant such that the friction and wear properties of the metal surfaces are improved.

SUMMARY OF THE INVENTION

We have discovered that in order to coat metal surfaces immersed in oil-based lubricants with a friction-reducing and wear-reducing film and to make in-situ repair of such films possible, an electrochemical process rather than a chemical process must be utilized. An added benefit of the electrochemical process is that films of more uniform and greater thickness may be formed.

In order to apply the electrochemical process to form friction-reducing and wear-reducing film on metal surfaces immersed in oil-based lubricants, the lubricant must first become a component of the electrochemical system, i.e., an ionic conductor. Since oil-based lubricants have extremely high electrical resistance, electrolytic additives must be blended into the oil-based lubricants at a desirable concentration to reduce the electrical resistance and to improve the electrical conductance. Stable open-circuit potential readings are thus obtained and electrical current is passed between the metal surfaces.

We have discovered that suitable electrolytic additives for our oil-based lubricants are dialkyl hydrogen phosphates, specifically, dilauryl hydrogen phosphate (DHP) and mixed-alkyl acid orthophosphate. For instance, friction-reducing and wear-reducing iron phosphate films were detected on surfaces of cast iron electrodes after immersion in an oil-based lubricant containing 2.5 wt% dilauryl hydrogen phosphate and after being subjected to electrolysis. This suggests that the formation of a uniform friction-reducing and wear-reducing film and in-situ repair of damaged films on sliding surfaces are possible.

BRIEF DESCRIPTION OF THE DRAWINGS

Other objects, features and advantages of the present invention will become apparent upon consideration of the specification and the appended drawings, in which.

DETAILED DESCRIPTION OF A PREFERRED EMBODIMENT

The reduction of engine friction through lubricant modification is one of the most appealing approaches for improving vehicle fuel economy because the benefits realized can be readily applied to all vehicles at low cost. Our previous work has shown that additive interaction with lubricated sliding surfaces plays an important role in the reduction and control of friction and wear. It is known that additives used to reduce friction and wear are usually long straight-chain organic molecules having a polar group at one end. The magnitude of the polarity is an important factor in its performance in reducing friction.

We have discovered that in order to coat metal surfaces immersed in oil-based lubricants with a friction-reducing and wear-reducing film, an electrochemical process rather than a chemical process must be utilized. Additional benefits of using the electrochemical process are films of more uniform and greater thickness may be formed and in-situ repair of such friction-reducing and wear-reducing films may be possible.

It is commonly believed that oil-based lubricants are insulators rather than ionic conductors and therefore they are poor components for electrochemical systems. We have discovered that in order to apply an electrochemical technique to the formation of friction-reducing and wear-reducing films on metal surfaces immersed in an oil-based lubricant, the lubricant must first become a component of the electrochemical system, i.e., an ionic conductor.

In our novel invention, dialkyl hydrogen phosphates, specifically dilauryl hydrogen phosphate and mixed-dialkyl acid orthophosphate, are used to change the ionic character of the oil-based lubricant. For instance, friction-reducing and wear-reducing iron phosphate films of sufficient thickness were formed on surfaces of cast iron electrodes after immersion in an oil-based lubricant containing 2.5 wt% dilauryl hydrogen phosphate and after being subjected to electrolysis.

The lubricant used in our invention is a simple lubricant without any additive, CITGO 90105 mineral oil, commercially available from Cities Service. The additive dilauryl hydrogen phosphate (DHP) used in our invention is of reagent grade obtained from the Mobil Corporation.

Figure 1:
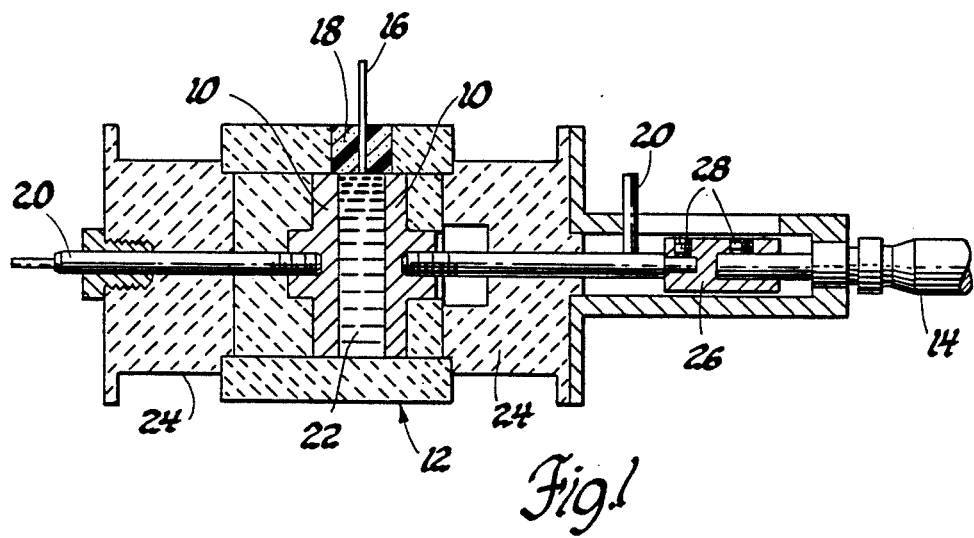
FIG. 1 is a schematic showing a cross-sectional view of the electrochemical cell.

Referring initially to FIG. 1, an electrochemical cell composed of two iron electrodes 10 embedded in a ceramic sleeve 12 is shown. The purpose of the ceramic sleeve 12 is to help maintain lubricant between the electrodes 10 and to maintain uniform current distribution. Since the electrical conductivity of lubricant systems in general is extremely low, i.e., smaller than $10^{-10}$ (ohms-cm)$^{-1}$, the two electrodes 10 have to be very closely spaced to each other in order to lower the ohmic resistance. A micrometer 14 is used to control the distance between electrodes 10. We have found a suitable distance to be used is 0.015 cm. The micrometer 14 is connected to one of the electrodes through insulating block 26 and set screws 28.

Since iron-based alloys are the most commonly used material for lubricated sliding surfaces in automobiles, the majority of work in our invention has been conducted by using iron electrodes. Potentials were measured between iron and one of the other five metals containing aluminum, copper, chromium, nickel, and platinum. A steady electrochemical potential reading established between iron and any other metal suggests the possibility of using that metal as a reference electrode.

Although the iron electrodes in the electrochemical cell could be replaced by other metals, we have found that it is more convenient for potential measurements by installing a third electrode 16 on top of the ceramic sleeve 12. This third electrode 16 is either made of a 99.9% pure metal wire of aluminum, copper, nickel, or platinum or made of a copper wire electrochemically plated with a chromium coating. It is glued in place by epoxy in a boron nitride block 18. The potential difference between the iron and the third electrode 16 is measured by a Keithley Electrometer.

The cast iron electrodes 10 in FIG. 1 are of 1" diameter. One of the two electrodes was used as the anode, and the other was used as the cathode. The choice was arbitrary. The roughness of the electrodes was grounded to less than 1 micron. We have found that the thickness of the electrodes is not critical. Before the electrolysis, the electrodes 10 were rinsed with acetone to remove grease on the surfaces.

Cast iron electrode leads 20 (FIG. 1) are made of stainless steel to collect current passing through the electrodes 10 and the lubricant 22 contained in ceramic sleeve 12. The size of the leads is not critical because of the extremely small amount of current passing through it. Two ceramic blocks 24 are used to insulate the two cast iron electrodes 10 from the container (not shown) of the electrochemical cell which is made of stainless steel. All tests were conducted at 23° C.

Our test lubricant is prepared by mixing 97.5 grams of CITGO 90105 mineral oil with 2.5 grams of DHP. A triangular potential waveform was applied between the two cast iron electrodes 10 (FIG. 1). This waveform was produced by a Princeton Applied Research Model 175 Universal Programmer and a Princeton Applied Research Model 173 Potentiostat/Galvanostat. The maximum and the minimum potentials used were 5 volts and $-5$ volt, respectively. The current generated by the triangular potential waveform versus potential between the test electrodes were then recorded on an oscilloscope. If it was found that current would pass between two electrodes immersed in a particular lubricant, then the electrodes were galvanostatically polarized in the same lubricant and the electrode surfaces were analyzed afterwards to determine if any reaction film has been formed.

The electrode surfaces were analyzed using scanning electron spectroscopy, back scattered electron spectroscopy, Auger electron spectroscopy (AES), electron spectroscopy for chemical analysis and X-ray diffraction. The lubricants were also analyzed by infrared spectroscopy, and nuclear magnetic resonance.

Figure 2:
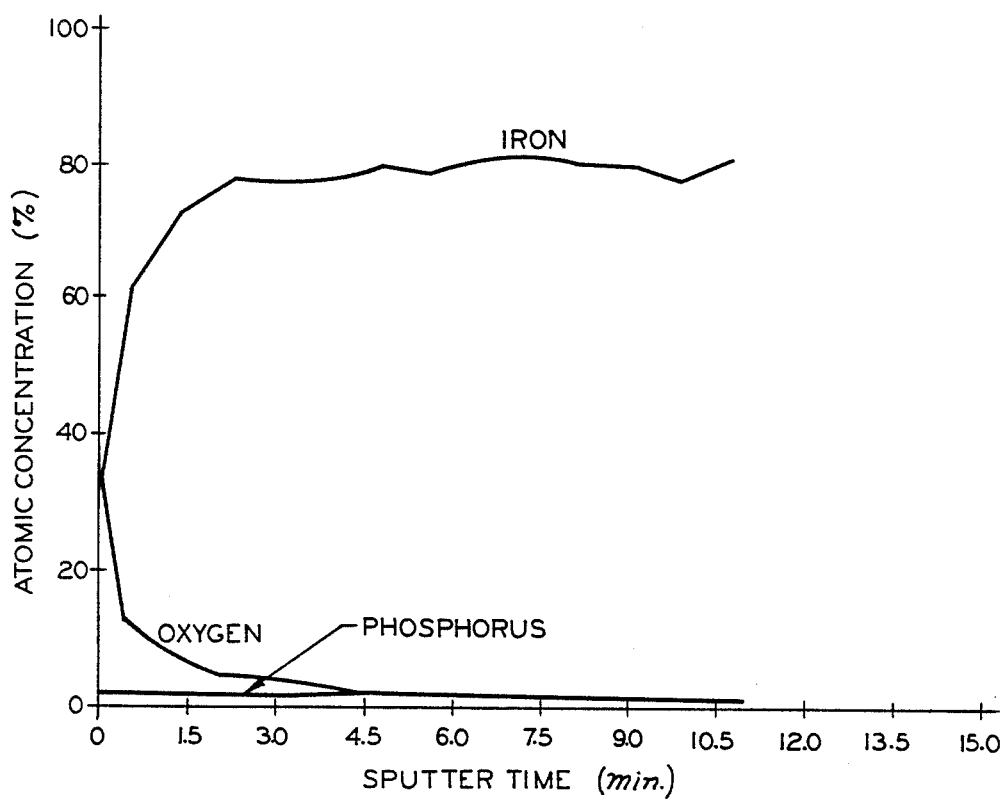
FIG. 2 is a graph showing Auger Electron Spectroscopy data obtained on an anode immersed in an oil-based lubricant containing 2.5 wt% dilauryl phosphate additive before electrolysis.
Figure 3:
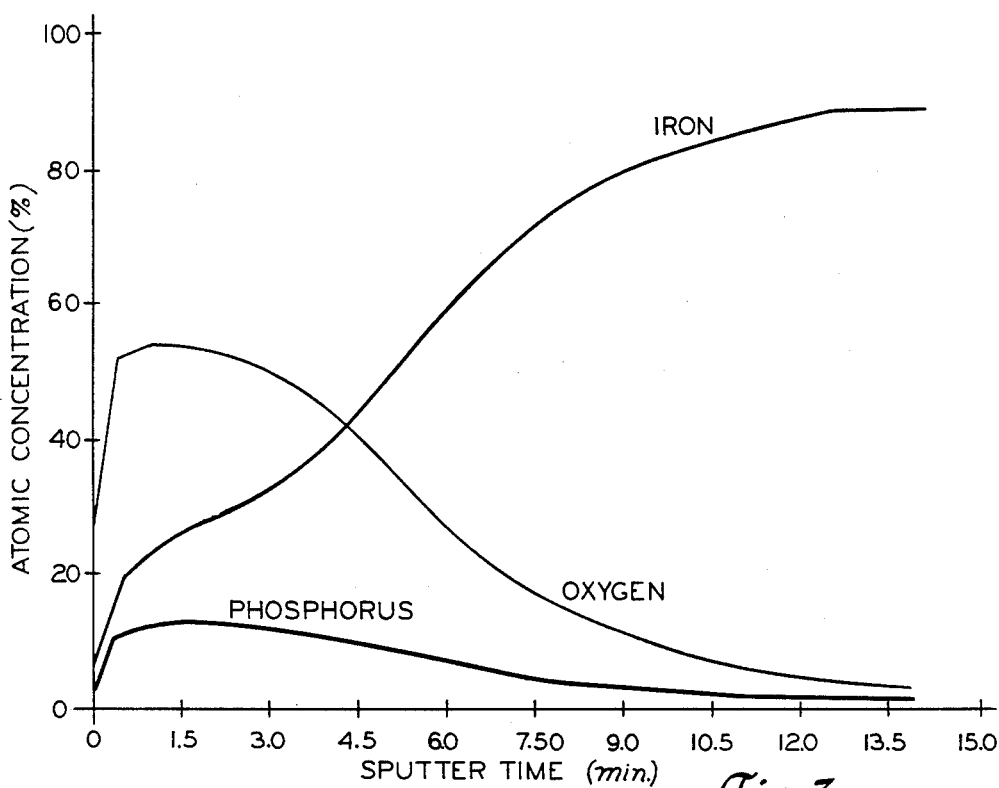
FIG. 3 is a graph showing the Auger Electron Spectroscopy data obtained on an anode immersed in an oil based lubricant containing 2.5 wt% dilauryl hydrogen phosphate after electrolysis.

Two cast iron electrodes 10 (FIG. 1) mounted in an electrochemical cell were galvanostatically polarized at a current of 0.05 micro-amp. After passing 108 micro-Coulomb of charge, the electrodes were removed for analysis. In order to identify the films, both the anode and the cathode were analyzed by the Auger electron spectroscopy (AES). Depth profiles determined on the anode after 108 micro-Coulomb of charge had passed through the system are shown in FIG. 3. FIG. 2 contains data obtained on anode immersed in CITGO 90105 mineral oil with 2.5 wt% DHP added before electrolysis while FIG. 3 contains data obtained on the same anode immersed in CITGO 90105 mineral oil containing 2.5 wt% DHP additive after electrolysis. The sputter rate used in AES was determined to be 25 nm/min using a silicone dioxide/silicone standard. FIG. 2 shows that only a thin oxide film about 10 nm thick was detected on the anode surface. It is believed that the thin oxide film was formed outside of the electrochemical cell due to oxidation of the electrodes in air. The flat line on the bottom of the graph shows that the phosphorus content on the surface of the anode is near zero through the whole range of sputter times. In other words, no iron phosphate was detected.

Quite different results were obtained on the anode after 108 micro-Coulomb of charge was passed between the two electrodes for 36 minutes. A film composed of iron, phosphate and oxygen was detected on the anode. The thickness of the film was estimated to be 150 nm based on the depth profile shown in FIG. 3 and the reported sputter rate. The proportions existing among the elements detected in this film indicated that the film is composed of iron phosphate, $Fe_3(PO_4)_2$. Due to the semi-quantitative nature of AES, the film was further identified and confirmed to be iron phosphate by the techniques of ESCA and X-ray diffraction techniques.

We have used a current density of 0.05 micro-amp/cm$^2$ in the formation of iron phosphate film on the surface of 1 inch diameter iron electrodes in our novel invention. Our experimental data indicated that any current density within the range of 0.001 micro-amp/cm$^2$ to 1000 micro-amp/cm$^2$ should work equally well. The current density to be used is determined by the length of the charge time desired, i.e., the smaller the current density, the longer the charge time required. We have also found that at a current density of 0.05 micro-amp/cm$^2$, a total charge time of approximately 36 minutes is required to form an iron phosphate film of 150 nm thick.

We have also used other dialkyl hydrogen phosphates as the electrolytic additive in our oil-based lubricants to form friction-reducing and wear-reducing films. For instance, a mixed-dialkyl acid orthophosphate commercially available from DuPont under the trade name of Ortholeum 162 was successfully used to form iron phosphate films in our oil-based lubricants. We have also found that a suitable percentage of the dialkyl hydrogen phosphate to be used as our electrolytic additive is in the range between 0.1 to 20 weight percent, with a range between 1 to 5 weight percent been preferred.

Figure 4:
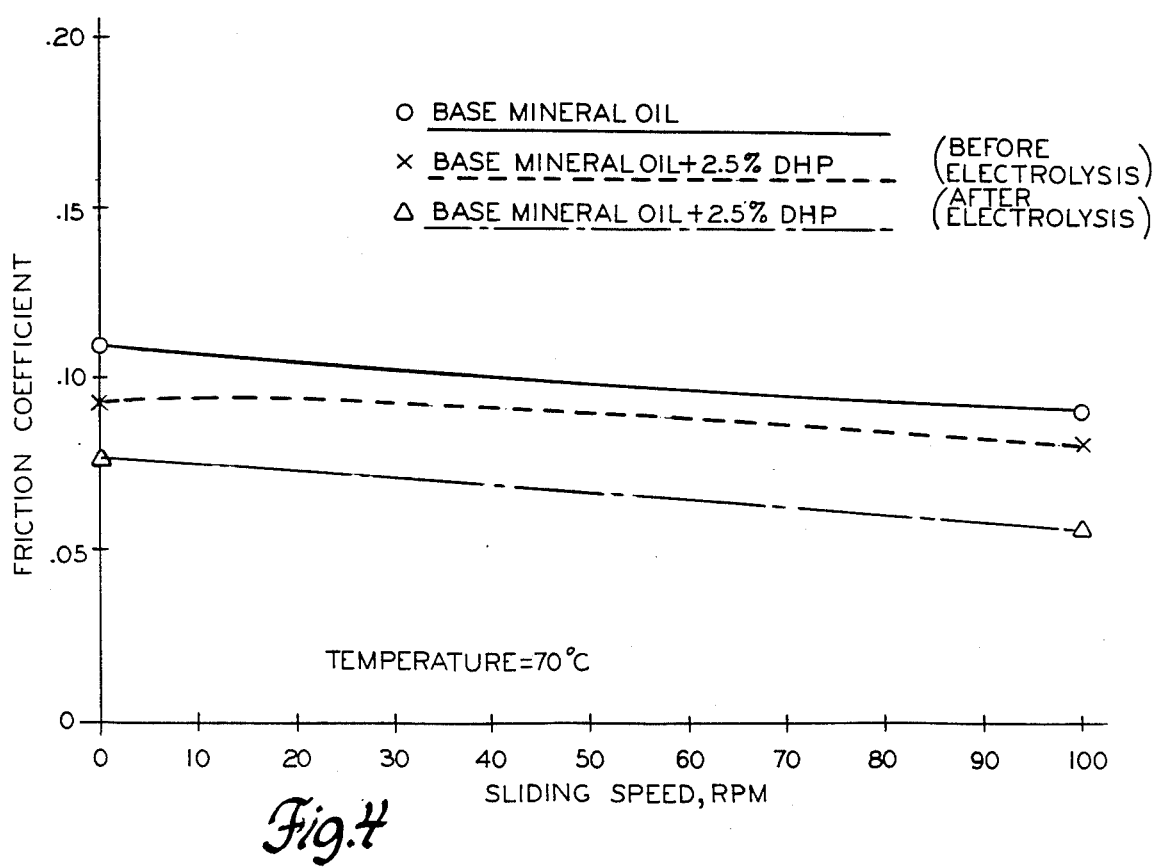
FIG. 4 is a graph showing the friction-reducing effect of an iron phosphate film formed electrochemically on a metal surface immersed in an oil-based lubricant containing 2.5 wt% dilauryl hydrogen phosphate.

After an iron electrode is coated with a friction-reducing and wear-reducing iron phosphate film, the friction characteristics of the electrode were tested. The data are shown in FIG. 4. A high frequency friction tester commercially available from Cameron-Plint Tribology Ltd. in England was employed in this testing. In FIG. 4, the friction coefficient of the coated iron electrode surface is plotted against the sliding speed of the tester in rpm. It is seen that the mere addition of 2.5 wt% DHP additive to the base mineral oil without charging inproves the friction of coefficients slightly. However, a great improvement in the frictional property of the iron electrode surface is achieved after charging with 108 micro-Coulomb. The coefficient of friction of the surface was reduced by nearly 40%. These data suggest that the formation of a uniform friction-reducing and wear-reducing film on the iron electrode surface is achieved. Furthermore, in-situ repair of damaged films on sliding metal surfaces is also possible by charging the system periodically during the operation of the system. For instance, this technique can be applied to the in-situ repair of iron phosphate films formed between sliding components in an internal combustion engine, i.e., the piston ring and the cylinder surface.

While our invention has been described in terms of one preferred embodiment thereof, it is to be appreciated that those skilled in the art will readily apply these teachings to other possible variations of the invention.

The embodiments of the invention in which an exclusive property or privilege is claimed are defined as follows:

1. A method of forming a friction-reducing and wear-reducing film on the surface of a cast iron anode means spaced apart from a cathode means both immersed in an oil-based lubricant by an electrochemical process comprising the steps of blending an electrolytic additive of a dialkyl hydrogen phosphate into said oil-based lubricant such that sufficient electrical current may pass in said lubricant, passing an electrical current of sufficient current density between said anode and cathode means whereby a friction-reducing and wear-reducing film is formed substantially of iron phosphate on the surface of said anode means.

2. A method of forming a friction-reducing and wear-reducing film on the surface of a cast iron anode means spaced apart from a cathode means both immersed in an oil-based lubricant by an electrochemical process comprising the steps of blending a suitable amount of an electrolytic additive of a dialkyl hydrogen phosphate selected from the group consisting of dilauryl hydrogen phosphate and mixed-dialkyl acid orthophosphate into said oil-based lubricant such that sufficient electrical current may pass in said lubricant, passing an electrical current of sufficient magnitude between said anode and cathode means for a sufficient length of time whereby a friction-reducing and wear-reducing film is formed substantially of iron phosphate on the surface of said anode means.

3. A method of forming a friction-reducing and wear-reducing film on the surface of a cast iron anode means spaced apart from a cathode means both immersed in an oil-based lubricant by an electrochemical process comprising the steps of blending between 0.1 to 20 weight percent of an electrolytic additive of a dialkyl hydrogen phosphate selected from the group consisting of dilauryl hydrogen phosphate and mixed-dialkyl acid orthophosphate into said oil-based lubricant such that sufficient electrical current may pass in said lubricant, passing an electrical current having a current density between 0.001 to 1000 micro-amp/cm$^2$ between said anode and cathode means for a sufficient length of time whereby a friction-reducing and wear-reducing film is formed substantially of iron phosphate on the surface of said anode means.

4. A method of forming a friction-reducing and wear-reducing film on the surface of an anode means spaced apart from a cathode means both immersed in an oil-based lubricant by an electrochemical process comprising the steps of blending between 1 to 5 weight percent of an electrolytic additive of a dialkyl hydrogen phosphate selected from the group consisting of dilauryl hydrogen phosphate and mixed-dialkyl acid orthophosphate into said oil-based lubricant such that sufficient electrical current may pass in said lubricant, passing an electrical current having a current density between 0.01 to 100 micro-amp/cm$^2$ between said anode and cathode means for a period of time between 200 to 1 minutes whereby a friction-reducing and wear-reducing film is formed substantially of iron phosphate on the surface of said anode means.

* * * * *